(12) United States Patent
Foster

(10) Patent No.: US 11,675,482 B2
(45) Date of Patent: Jun. 13, 2023

(54) PLAY-CALL DISPLAY AND PERSONNEL BOARD SYSTEMS

(71) Applicant: James Michael Foster, Raytown, MO (US)

(72) Inventor: James Michael Foster, Raytown, MO (US)

( * ) Notice: Subject to any disclaimer, the term of this patent is extended or adjusted under 35 U.S.C. 154(b) by 0 days.

(21) Appl. No.: 17/656,686

(22) Filed: Mar. 28, 2022

(65) Prior Publication Data

US 2022/0308713 A1    Sep. 29, 2022

Related U.S. Application Data

(60) Provisional application No. 63/200,790, filed on Mar. 29, 2021.

(51) Int. Cl.
| | |
|---|---|
| *G06F 3/0482* | (2013.01) |
| *G09B 19/00* | (2006.01) |
| *A63B 71/06* | (2006.01) |
| *H04W 4/80* | (2018.01) |

(52) U.S. Cl.
CPC ........ *G06F 3/0482* (2013.01); *A63B 71/0619* (2013.01); *G09B 19/0038* (2013.01); *H04W 4/80* (2018.02); *A63B 2071/0694* (2013.01); *A63B 2225/50* (2013.01); *A63B 2243/007* (2013.01)

(58) Field of Classification Search
CPC ............... G06F 3/0482; A63B 2225/50; A63B 71/0619; A63B 2071/0694; A63B 2243/007
See application file for complete search history.

(56) References Cited

U.S. PATENT DOCUMENTS

| | | | |
|---|---|---|---|
| 11,050,488 B1* | 6/2021 | Cronmiller | H04B 10/116 |
| 2008/0206723 A1* | 8/2008 | Hunter | G09B 19/0007 434/156 |
| 2012/0242669 A1* | 9/2012 | Weiler | G09G 5/00 345/467 |
| 2019/0240559 A1* | 8/2019 | Lewis | A63B 71/0605 |

\* cited by examiner

*Primary Examiner* — Priyank J Shah
(74) *Attorney, Agent, or Firm* — Husch Blackwell LLP

(57) ABSTRACT

A display board system for football coaching applications is provided. The system enables football coaching staffs to communicate any convey information to on-field players, such as the personnel types of the opposing team or the specific play call for the ensuing play. The system includes a visual display board, a control device, and a control application. The display board includes one or more rows of illuminating numbers that displays any selected set of one or more numerical digits for viewing by the on-field players. The control device is in electronic communication with the display board via wired or wireless connection and is configured for use by the coaching staff to input the desired information for display on the display board. The control application is a programming application configured to run on the control device to enable operation of the control device to display information on the display board.

8 Claims, 4 Drawing Sheets

PLAY-CALL DISPLAY AND PERSONNEL BOARD SYSTEMS

CROSS-REFERENCE TO RELATED APPLICATIONS

This application claims priority to U.S. Provisional Patent Application Ser. No. 63/200,790, filed on Mar. 29, 2021, to James Michael Foster, entitled "Play-Call Display and Personnel Board Systems," the entire disclosure of which is incorporated herein by reference.

BACKGROUND OF THE INVENTION

During a football game, coaching staffs commonly need to convey information from the sidelines to the players on the field. This information includes (i) the personnel configuration of the offense for the upcoming play, and (ii) the particular play-call for both the offense and defense for the upcoming play. The current traditional methods and systems used to convey this information to the players on the field is inefficient, time consuming and can lead to confusion and mistakes for the on-field players. Accordingly, a need exists for an improved play-call display system and a personnel board system configured for use during football games to enable the coaching staff to efficiently and accurately convey the play-call and the offensive personnel configuration during the course of the football game.

BRIEF SUMMARY OF THE INVENTION

The present invention is directed generally to a display board system that can be utilized by football coaching staffs during games to convey information to their players on the field. The display board system of the present invention according to one embodiment is directed to a personnel board system that can be used to convey the opposing offensive unit's personnel grouping to the defensive players prior to each play. The personnel board system can include a display board, a control device, and a control application. The display board can include a display panel and perimeter frame. The display board can be configured to display two numbers on the display panel by means of one or more lighting elements provided in the display panel.

The control device can be configured as any suitable electronic control component such as a mobile phone or tablet. The control device can be in electronic communication with the display board by wired or wireless communications technology. The control application can be configured to operate on the control device and enable a user to enter information into the control device and transmit the information to the display board. The control application can be configured with an interface to display numbers 0-9 and enable a user to select the specific numbers to display on the display board.

A user can operate the personnel board system by identifying the total number of players for particular positions of interest (e.g., TEs and RBs) and enter the total number of opponents players on the field for each position into the control application by the interface. Once entered, the numbers can be transmitted from the control device to the display board, where it they are displayed on the display panel to inform the players of the number of opponent players for each position of interest.

The display board system of the present invention according to another embodiment is directed to a play-call board system that can be used to convey an encoded play-call to the players on the field prior to the play. The play-call board system can include a display board, a control device, and a control application. The display board can include a display panel configured to display three color coordinated number rows (or rows with any other distinguishing feature) and a perimeter frame surrounding the display panel. The display panel can include one or more lighting elements that selectively illuminate to display a three separate single digit numbers in each coordinated number row.

The control device can be configured as any suitable electronic control component such as a mobile phone or tablet. The control device can be in electronic communication with the display board by wired or wireless communications technology. The control application can be configured to operate on the control device and enable a user to enter information into the control device and transmit the information to the display board. The control application can be configured with an interface that displays numbers 0-9 and enables the user to select a desired color or other feature associated with the coordinated row on the display board to set as the "live" row. The interface can also enable the user to select the specific numbers to display on the live row on the display board. The control application can further be configured to generate two random three-digit numbers for display on the non-live rows.

A user can operate the play-call system by identifying the desired play and the desired "live" color or feature for the ensuring play. The user can then select the "live" color on the interface of the control application and enter the three-digit number corresponding to the desired play. The three-digit number is then transmitted to the display board for display on the coordinated row corresponding to the selected "live" color or feature while the remaining "non-live" rows each display a random three-digit number generated by the control application. The players on the field can then read the display board and determine the play called based on the three-digit number displayed in the "live" row.

Other aspects and advantages of the present invention will be apparent from the following detailed description of the preferred embodiments of the accompanying drawing figures.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

Figure 1:
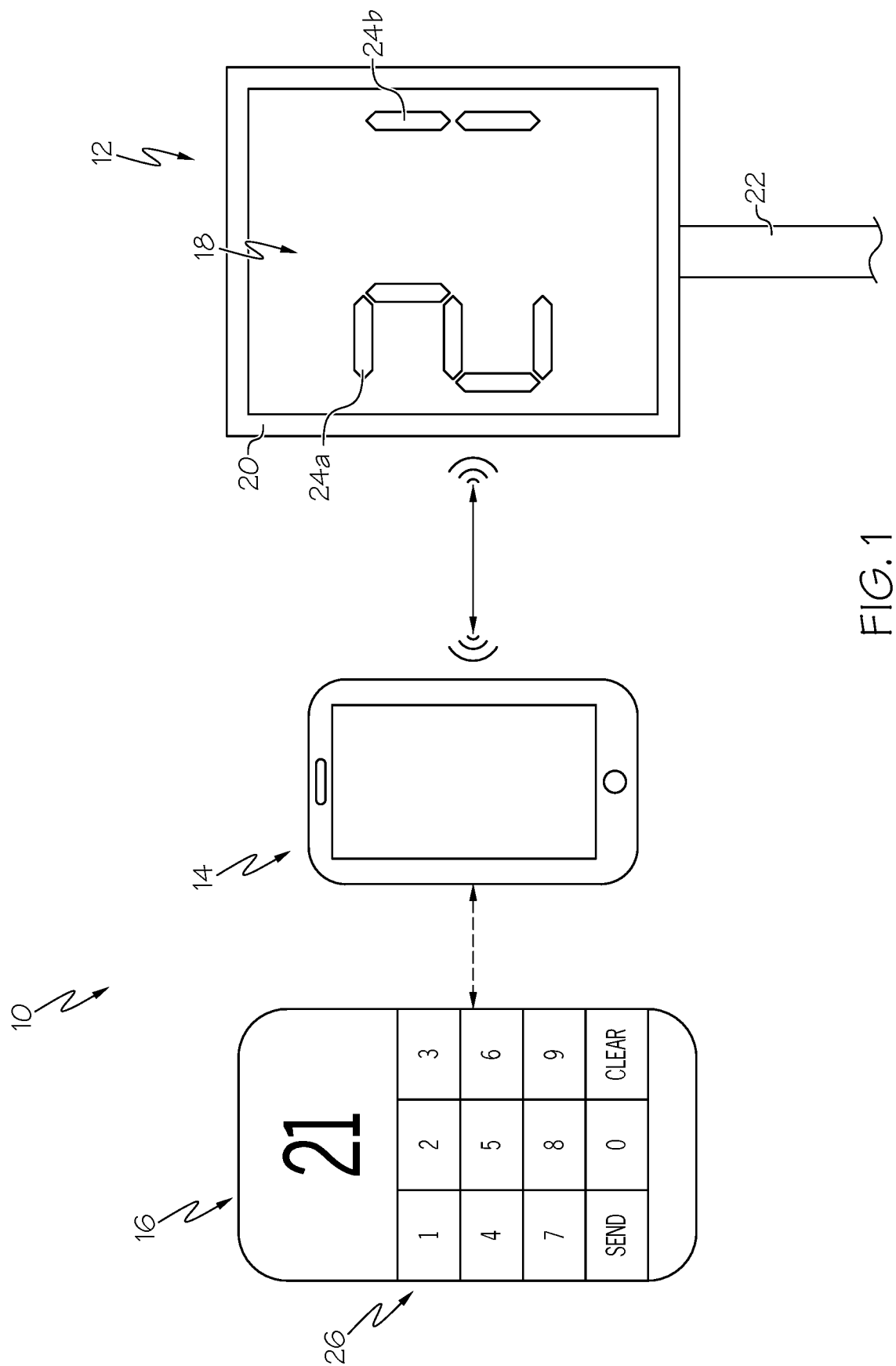
FIG. 1 is a schematic view of a personnel board system in accordance with one embodiment of the present invention.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. It will be appreciated that some or all of the various features and structures described and shown with respect to each of the specific embodiments referenced herein may be combined to form additional or alternative embodiments having such combinations and that such combinations are within the scope of the present invention.

The present invention is directed to different embodiments of display board systems that can be utilized by coaching staffs during football games to effectively convey information to the players on the field. During the course of a football game, both the offensive and defensive coaching staffs are required to convey various types of information to the players on the field. Two particular types of information that the coaching staffs must convey are (i) the offensive personal types that are currently on the field for the ensuing play, and (ii) the particular play to be ran for the ensuing play. The display board systems of the present invention are configured to facilitate the coaching staffs in conveying this information to the on-field players in a faster, more efficient, more secure, and more reliable manner.

The present invention according to one embodiment is directed to a personnel board system 10 that can be utilized by defensive coaches during the course of a football game to convey the opposing offensive unit's personnel grouping to the defensive players prior to each play. During a football game, the defensive coaching unit typically relays the particular personnel group of the offensive players before each play by indicating the number of tight ends (TEs) and the number of running backs (RBs) that have entered the game for the upcoming play. Traditionally, at least one defensive coach is tasked with watching the offensive players that come onto and/or leave the field after a play in preparation for the next play. That defensive coach then counts the total number of TEs on the field and the total number of RBs on the field and conveys this information to the defensive players on the field. The total number or wide receivers (WRs) are also known by subtracting the number of TEs and RBs from the available player positions, which conveys the total personnel distribution of the offensive.

Typically, the offensive personnel distribution is conveyed to the defensive players on the field by displaying the number of TEs and the number of RBs on the field. This is usually accomplished by holding up a personnel card or poster in a location where the defensive players can see the card/poster. This card includes two numbers: the first identifying the total number of TEs on the field and the second identifying the total number of RBs on the field. In order to account for several different potential configurations of offensive personnel, a member of the defensive staff must carry up to 12 different cards/posters, one for each possible personnel grouping possible (e.g., 10, 11, 12, 13, 14, 20, 21, 22, 23, 30, 31, 32). Once the defensive staff member identifies the total number of TEs and the total number of RBs on the field, the staff member must select the particular display card/poster corresponding to the total number of TEs and RBs and hold the card/poster up for the defensive players on the field to see.

There are several inefficiencies that result from this traditional card/poster system. Most importantly, the defensive staff member must spend time sorting through the several cards/poster to identify the accurate card/poster in order to display the correct TE and RB personnel numbers to the defense. Not only does this task take extra time complete, which leads to less time for the defensive players on the field to prepare for the next play, but the defensive staff member can sometimes accidentally display the wrong card when attempting to quickly shuffle through set of cards/posters to convey the offensive personnel arrangement. The personnel board system 10 of the present invention functions as an improvement to the traditional system and reduces the inefficiencies described above. It is also recognized the personnel board system 10 of the present invention may be used to convey personnel arrangement for many other positions by football coaching staffs and also may suitably be used for many different types of applications in athletics coaching, particularly, football coaching and is not necessarily limited to conveying the offensive personnel arrangement of the opposing team.

Turning to FIG. 1, the personnel board system 10 of the present invention is illustrated schematically according to one embodiment. As best shown in FIG. 1, personnel board system 10 can include a display board 12 configured to selectively display two numbers 24 corresponding to the number of TEs and RBs currently in the offensive personnel grouping, a control device 14 configured to operate and control the display board 12, and a control application 16 configured to allow a user to input and relay information from the control device 14 to the display board 12. As described herein, numbers 24 can be configured as two separate numbers, a first number 24a and a second number 24b, which can be intended to represent different types of information. As a non-limiting example, first number 24a can be configured to convey the number of TEs and second number 24b can be configured to convey the number of RBs.

As further shown in FIG. 1, display board 12 can be configured with a vertical display panel 18 that is surrounded by a perimeter frame 20. Display board 12 can further be configured with a stand or pole component 22 for holding the display board 12 up for easy viewing by the defensive players on the field. According to one embodiment, display board 12 can be configured similar to a traditional down marker used to convey the down and distance during football games.

As further shown in FIG. 1, vertical display panel 18 can include several LED lights (or other suitable lighting elements) that are configured to selectively display the two display digits or numbers 24 signifying the number of TEs on the field and the number of RB s on the field. Display panel 18 can also be encapsulated in polymer or other protective coating in order to protect the LED lighting elements from damage. According to one embodiment, display numbers 24 can be of a different color than that of the standard down markers that are used during a football game in order to allow players to easily differentiate between the two display systems; however, any suitable color can be used for the display numbers 24. It is also recognized that alternative lighting components in place of the LED lights can also suitably be utilized to display the display digits 24 in alternative embodiments of the present invention. Perimeter frame 20 can be constructed from foam or any other suitable component that can contain the display panel 18.

As shown in FIG. 1, control device 14 can be configured as any suitable type of electronic control component. According to one embodiment, control device 14 can be a user's mobile device, such as a mobile phone or tablet or the like. According to other embodiments, control device 14 can be configured as a dedicated electronic device specific to the personnel board system 10 of the present invention. Control device 14 can include a display interface that allows a user to interface with and use control application 16. Control device 14 can also be configured with wired or wireless communication means in order to transmit information from control device 14 to display board 12. For example, control device 14 (and display board 12) can be configured with radio transmission, Bluetooth or other type of wireless communication means to wirelessly transmit information between the two components. This transmission can also be secured and/or encrypted in order to protect the information being conveyed to the display board 12 in certain embodiments of the present invention.

As shown in FIG. 1, control application 16 can be configured as a computer or software program component that operates on control device 14 in order to enable a user to enter information into control device 14 and transmit the information to display board 12. According to one embodiment, control application 16 can be configured as a mobile application downloadable and/or operational on control device 14. Control application 16 can include a number pad component 26 that displays numbers 0-9 and enables a user to select the specific numbers to display on the display board 12. Control application 16 can also include a send button component that directs control application 16 via control device 14 to send the entered digits to display board 12 to show as the display digits 24. Control application 16 can also include a clear button component to enable a user to clear the entered digits and the numbers currently being displayed by display board 12. Several other different features and functionality can also be incorporated into control application 16 depending on the particular embodiment.

For merely explanatory purposes, the use and operation of personnel board system 10 according to one embodiment of present invention will be described in further detail. In order to utilize personnel board system 10, a user (e.g., a defensive staff member) may use a mobile device 14 that has control application 16 provided thereon. The user can identify the total number of TEs and RBs that are currently on the field for the offense. Once the number of TEs and RBs are identified, the user can enter the number of TEs and then the number of RBs into the control application 16 (via number pad 26) and press send. The control device 14 can then wirelessly transmit the entered information to the display board 12, which then displays the two numbers on the vertical display panel 18 as the display numbers 24. For example, if there are two TEs and one RB on the field, the user can enter "2-1" into the control application 16 and press send in order to display "21" on the display panel 18. The defensive players on the field can view the display panel 18 and the display digits 24 in order to know the offensive player personnel for the upcoming play. Then prior to the next play, the user can clear the display numbers 24 by clearing the entry on the control application 16, identify the number of TEs and RBs for the next play and repeat the process to display the new personnel configuration for the next play.

The present invention according to another embodiment is directed to a play-call board system 100 that can be utilized by either offensive or defensive coaches during the course of a football game to convey an encoded play-call to the offensive or defensive players on the field prior to a play. Typically, the coaching staff will relay the particular play to be ran on the field to the on-field players by either relaying the play through a series of hand signals or holding up poster signs with coded messages for the on-field players to see. This usually requires three or more staff members (or backup players) that will display a series of hand signals or hold up poster signs containing a coded message that signals the play-call to be ran by the on-field players. One of these staff members will be relaying the actual play-call while the remaining staff members will relay "decoy" or "fake" play-calls in order to prevent the opposing team from knowing what the actual called play is. Not only does this traditional system require multiple staff members to execute, it requires a complex sequence of events that is time consuming and can lead to confusion by the on-field players. The play-board system 100 of the present invention functions as an improvement to this traditional system and reduces the inefficiencies described above.

Figure 2:
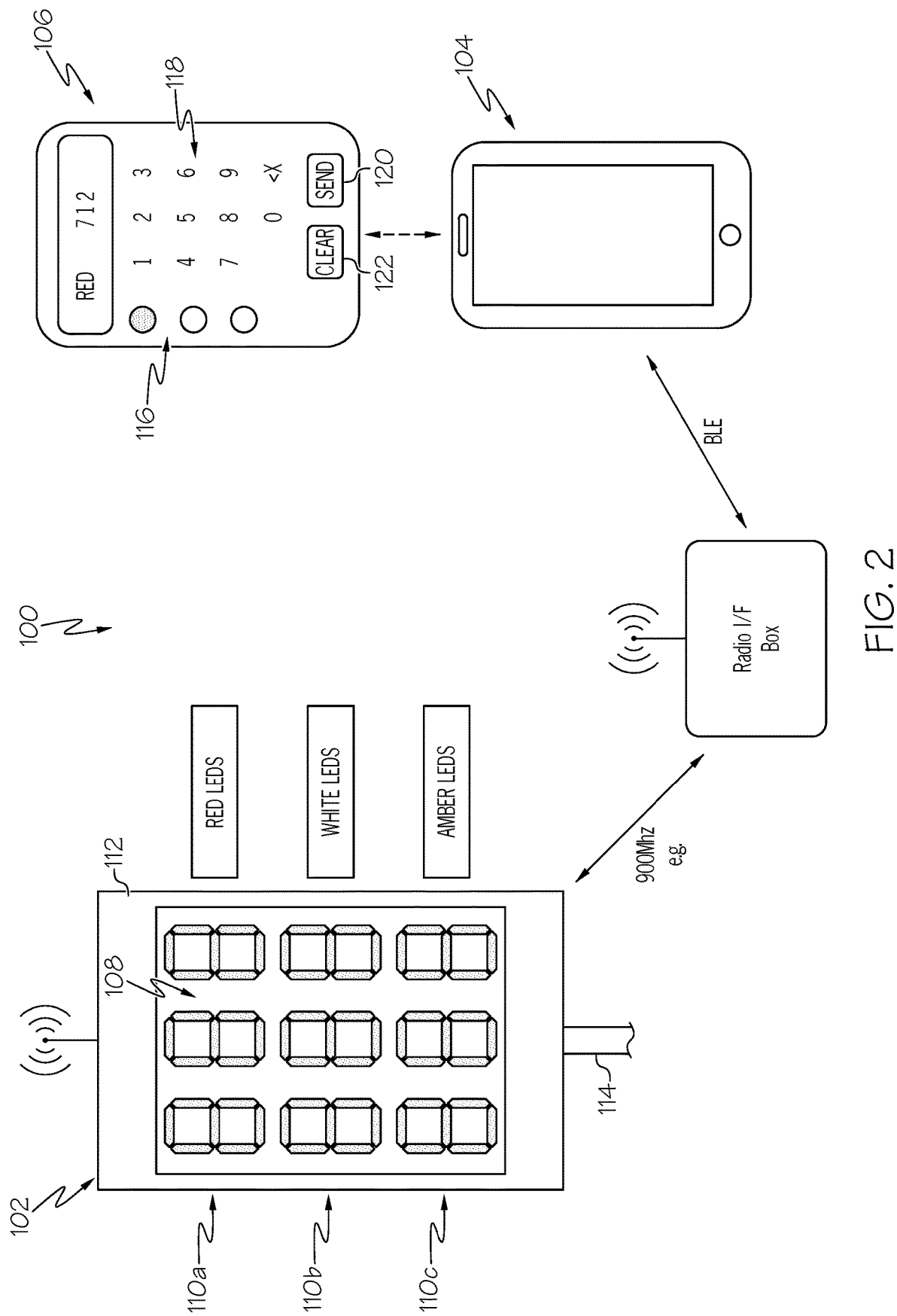
FIG. 2 is a schematic view of a play-call display board system in accordance with one embodiment of the present invention.
Figure 3:
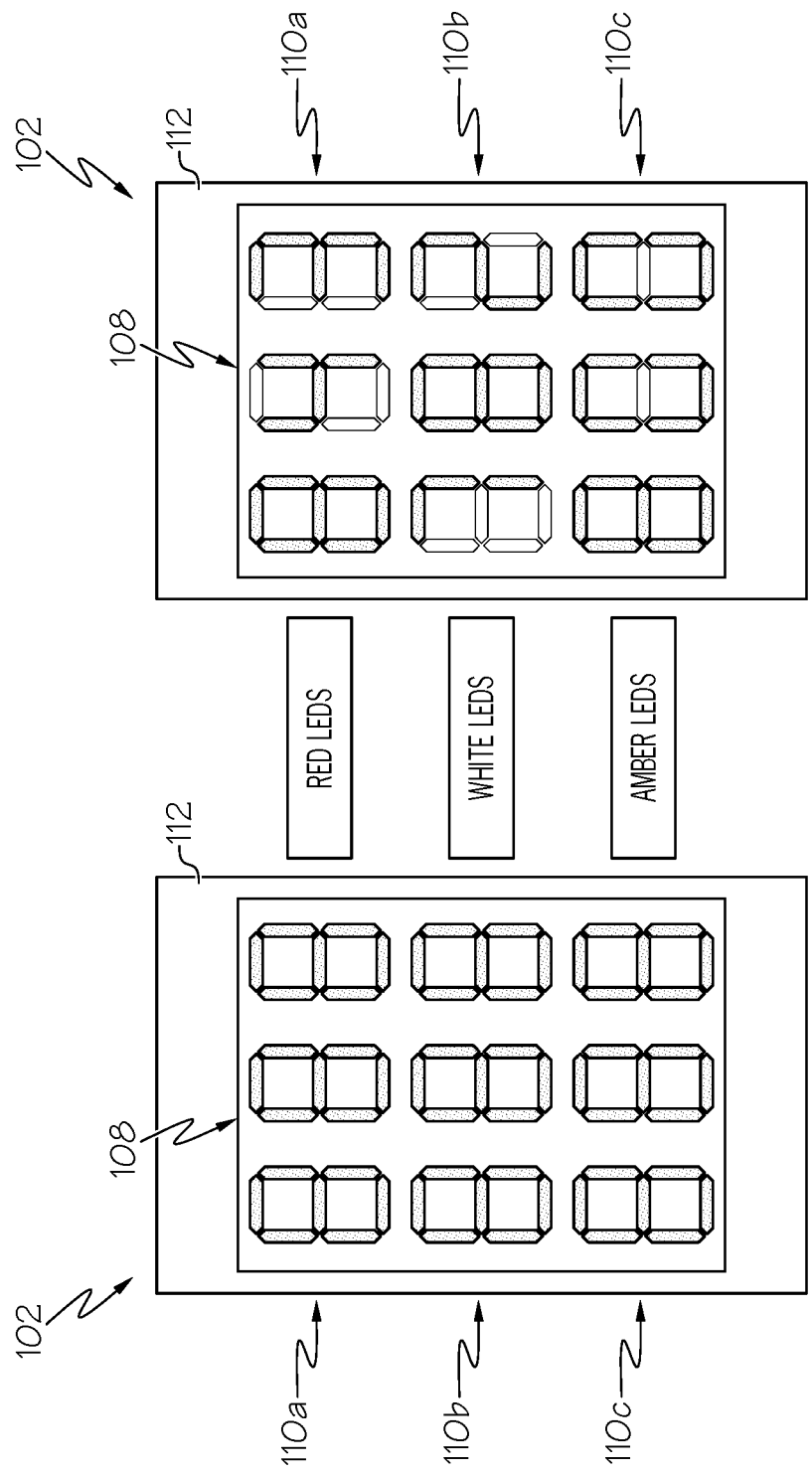
FIG. 3 is a schematic view of a display board for use with a play-call display board system in accordance with one embodiment of the present invention.
Figure 4:
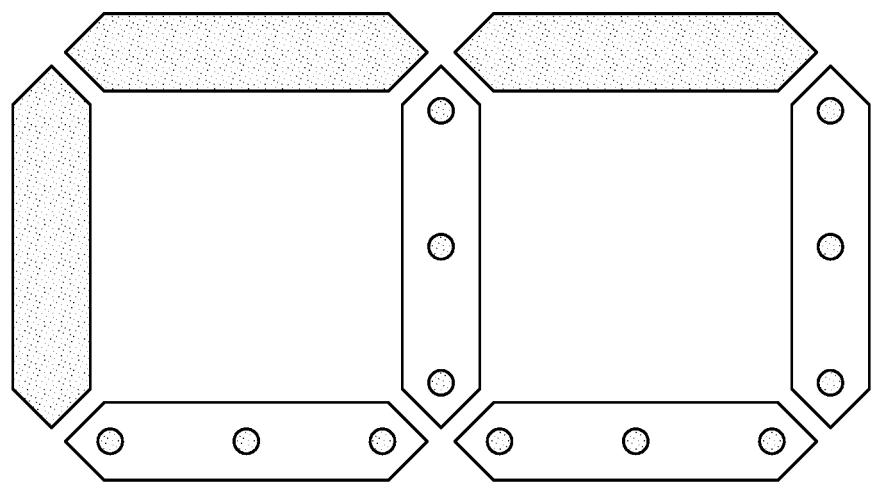
FIG. 4 is a schematic view of an LED lighting configuration for the display board of a play-call display board system in accordance with one embodiment of the present invention.
Figure 4:
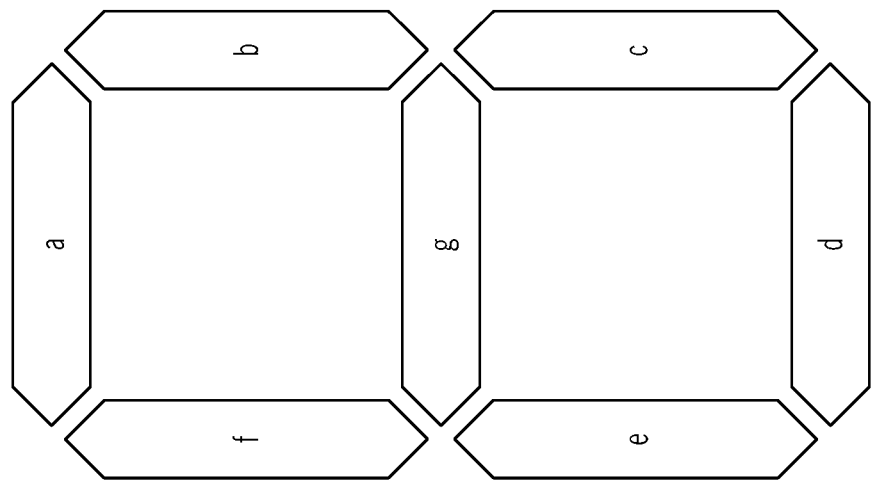

Turning to FIGS. 2-4, the play-board system 100 of the present invention is illustrated schematically according to one embodiment. As best shown in FIG. 2, the play-board system 100 can include a display board 102, a control device 104 and a control application 106. Display board 102 can include a vertical display panel 108 configured to display three color coordinated number rows 110a-110c and a perimeter frame 112 surrounding display panel 108. Display board 102 can also optionally include a stand component 114 configured to hold display board 102 in a generally vertical orientation. Stand component 114 can be configured as any suitable type of component used for holding displays, boards and the like, and can be configured with a post, support arms or legs or features depending on the desired application and use.

As best shown in FIG. 3, display board 102 can be designed and configured similar to traditional down markers currently utilized for football games. According to one embodiment, display board 102 can have dimensions of approximately 11 inches by 17 inches with a viewing area (i.e., display panel 108) of dimensions of approximately 10 inches by 13 inches. Each digit display in the color coordinated number rows 110a-110c can have dimensions of approximately 2.1 inches by 3.71 inches. However, the foregoing dimensions are merely exemplary and it is recognized that any dimension configurations can be used in alternative embodiments of the present invention.

As best shown in FIGS. 2 and 3, vertical display panel 108 can include three color coordinated number rows 110a-110c. System 100, display board 102 and display panel 108 can alternatively include any suitable number of rows 110 in alternative embodiments of the invention. Each color coordinated number row 110 can include a series of three single-digit LED number in a specific color (lighting components other than LEDs can also be suitably used for the numbers in each row). FIG. 4 schematically illustrates one potential configuration for the design of the LED lights used to construct the digit displays for the three digits in each color coordinated number row 110a-110c; however, any suitable design and configuration can also be utilized in various embodiments of the invention. As shown in FIGS. 2 and 3, according one particular embodiment, the numbers in the first row 110a can correspond to red, the number in the second row 110b can correspond to white, and the numbers in the third row 110c can correspond to amber. However, it is recognized that any suitable colors and color configurations can be used in various embodiments of the present invention. In addition, in alternative embodiments, in place of colors, numbered rows can be utilized or any other configuration for distinguishing between the number rows 110a-110c on the display board 102. For example, according to alternative embodiments, in place of colors, each numbered row 110a-110c can have a corresponding number or symbol that distinguishes the rows 110 from one another.

As best shown in FIG. 2, control device 104 can be configured as any suitable type of electronic control component. According to one embodiment, control device 104 can be a user's mobile device, such as a mobile phone or tablet or the like. According to other embodiments, control device 104 can be configured as a dedicated electronic device specific to the play-call board system 100 of the present invention. Control device 104 can include a display interface that allows a user to interface with and use control application 106. Control device 104 can also be configured with wired or wireless communication means in order to transmit information from control device 104 to display board 102. For example, control device 104 (and display board 102) can be configured with radio transmission, Bluetooth or other type of wireless communication means to wirelessly transmit information between the two components. According to one embodiment, system 100 can further utilize a radio transmitter in order to facilitate wireless communication between control device 104 and display board 102 as shown in FIG. 2. This configuration can enable the user to determine which frequency range to use to transmit communication between the control device 104 and display board 102. The transmission can also be secured and/or encrypted in order to protect the information being conveyed to the display board 102 in certain embodiments of the present invention. Control device 104 can also or alternatively be configured with different wired or wireless communication means that are typically used to transmit information or data between electronic devices.

As further shown in FIG. 2, control application 106 can be configured as a computer or software program component that operates on control device 104 in order to enable a user to enter information into control device 104 and transmit the information to display board 102. According to one embodiment, control application 106 can be configured as a mobile application downloadable and/or operational on control device 104. As best shown in FIG. 2, control application 106 can include a display interface with a color coordinated number row selection component 116 that can enable a user to select the particular color coordinated number row 110a-110c, a number pad component for 118 that can enable the user to enter the particular set of three numbers to display on the selected color coordinated number row 110a-110c, a send button component 120 to enable the user to send the entered numbers to the display panel 102, and a clear button component 122 to enable the user to clear the entered numbers previously sent to display panel 102. Several other different features and functionality can also be incorporated into control application 106 depending on the particular embodiment. For example, control application 106 can be configured to store a team's playbook to enable the user to simply select a play from the playbook and control application 106 automatically selects the corresponding three-digit number for the selected play.

For merely explanatory purposes, the use and operation of play-call board system 100 according to one embodiment of present invention will be described in further detail. In order to utilize play-call board system 100, a user (e.g., an offensive coach) may use a mobile device 104 (or designated control device) that has control application 106 provided thereon. When the user wants to provide a play-call to the on-field players, the user selects the "live" color on the control application 106 by selecting the desired color on the color coordinated number row selection component 116. The selected "live" color can either be signaled to the on-field players before each play or can be pre-determined by the team in any suitable manner. The user can then enter the three-digit number for the called play using the number pad component 118 on control application 106. Each play in the team's playbook can have one or more designated three-digit codes known by the coaching staff and players. Using a three-digit code system can allow a team to have up to 999 different plays. Typically, the coaching staff with have a chart with each play and its designated code or codes and the players will have a wristband with plays and corresponding designated codes. Often, the quarterback (or defensive captain) will have a wristband with the plays and corresponding codes and will use the wristband to match the received code to its corresponding play and then relay the play to the remaining on-field players.

Once the user enters the three-digit number, the user can send the entered number to the display board 102 by pressing the send button component 102 on control application 106. Control device 104 will then transit the three-digit number to the display board 102 and the display panel 108 will display three-digit number on the color coordinated number row 110a-110c that corresponds to the selected "live" color that was selected by the user. At the same time, control application 106 will generate two random three-digit numbers and transmit the numbers for display in the remaining two "non-live" color coordinated number rows 110a-110c of display panel 108. Because the on-field players already know what the "live" color is, they will know to use the three-digit number that is entered in the color coordinated number row 110a-110c corresponding to the "live" color.

For example, as shown in FIG. 3, if the pre-determined "live" color is red, the on-field players will know that the three-digit number for the called play is "843." In this instance, the user selected "red" as the live color via component 116 and entered "843" into the control application 106 via component 118. Upon pressing send via component 120, the three-digit number "843" is displayed in the red color coordinated number row 110a while two randomly generated three-digit numbers ("782" and "800") are displayed in the white and amber color coordinated number rows 110b and 110c. The on-field players, such as the quarterback, can then look at the display board 102 and identify the three-digit number (i.e., "843") in the red color coordinated row 110a. The player can then use their wristband to find the play that corresponds to the three-digit number and relay that play to the remaining on-field players.

Once the on-field players have received the three-digit number for the play, the user (i.e., coach) can press the clear button component 122 on the control application 106 which will transmit via control device 104 to display board 102 and clear the numbers displayed on the three color coordinated number rows 110a-110c until the user enter the next three-digit number for the ensuing play.

The play-call board system 100 of the present invention can offer several advantages of the traditional play-call systems currently utilized by football teams. System 100 of the present invention can reduce the total number of individuals (e.g., coaching staff members, backup players and other staff) required to convey the play-call from the sidelines to the on-field players. Traditional systems require one individual relaying the actual play-call and additional other individuals providing decoy play-calls in order to prevent the opposing team from knowing the play-call. Traditional systems can also lead to confusion if the on-field players miss the hand signals provided by the coaching staff or require the coaching staff to go through the hand signals additional times, resulting in less time for the on-field players to prepare for the upcoming play. System 100 of the present invention can allow the entire play-call system to be controlled and operated by one coach or individual. The coach can use a mobile phone or tablet that has control application 106 provided thereon to display the three-digit play number on the display board 102, which can be viewed by the players in order to know what play to run. The coach simply selects the "live" color and enters the desired three-digit play number, and that number is displayed on the corresponding color coordinated number row 110a-110c for the players to view. The on-field players can then use their wristband to identify the play corresponding to the three-digit number.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention.

What is claimed is:

1. A play-call board system configured to display an encoded number corresponding to a play-call to the on-field players during the course of a football game, said system comprising:
   a display board including a display panel and a perimeter frame surrounding said display panel, wherein said display panel includes at least three color coordinated number rows configured to selectively display a three-digit number, wherein each of said at least three color coordinated number rows include a feature for distinguishing said at least three color coordinated number rows, wherein said feature for each of said at least three color coordinated number rows comprises a different color in which said three-digit number is displayed;
   a control application configured to control the operation of said display board, said control application configured to operate through a control device;
   wherein said control application includes a display and interface that enables a user to select a live feature corresponding to one of said color coordinated number rows on said display panel, wherein said live feature is a live color corresponding to one of said at least three color coordinated number rows on said display panel;
   wherein said display and interface of said control application enables said user to enter a three-digit number for display on said color coordinated number row corresponding to said selected live color of said live feature;
   wherein said control application is configured to display a different randomly generated three-digit number in each of said color coordinated number rows not corresponding to said selected live color of said live feature.

2. The play-call board system of claim 1, wherein said different colors comprise red, white and amber.

3. The play-call board system of claim 1, wherein said display board and said control device are in electronic communication with one another.

4. The play-call board system of claim 3, wherein said display board and said control device are in wireless communication with one another.

5. The play-call board system of claim 4, wherein said wireless communication comprises radio transmission or Bluetooth transmission.

6. The play-call board system of claim 1, wherein said control device is a mobile phone device or a computer tablet device.

7. The play-call board system of claim 1, wherein said interface of said control application includes a number pad displaying digits 0 through 9 on said control device.

8. A play-call board system configured to display an encoded three-digit number corresponding to a play-call to the on-field players during the course of a football game, said system comprising:
   a display board including a display panel and a perimeter frame surrounding said display panel, wherein said display panel includes three color coordinated number rows configured to selectively display a three-digit number in a particular color;
   a control application configured to control the operation of said display board, said control application configured to operate through a control device;
   wherein said control application includes a display and interface that enables a user to select a live color corresponding to one of said color coordinated number rows on said display panel;
   wherein said display and interface of said control application enables said user to enter a three-digit number for display on said color coordinated number row corresponding to said selected live color;
   wherein said control application is configured to display a different randomly generated three-digit number in each of said color coordinated number rows not corresponding to said selected live color.

\* \* \* \* \*